Figure 1:
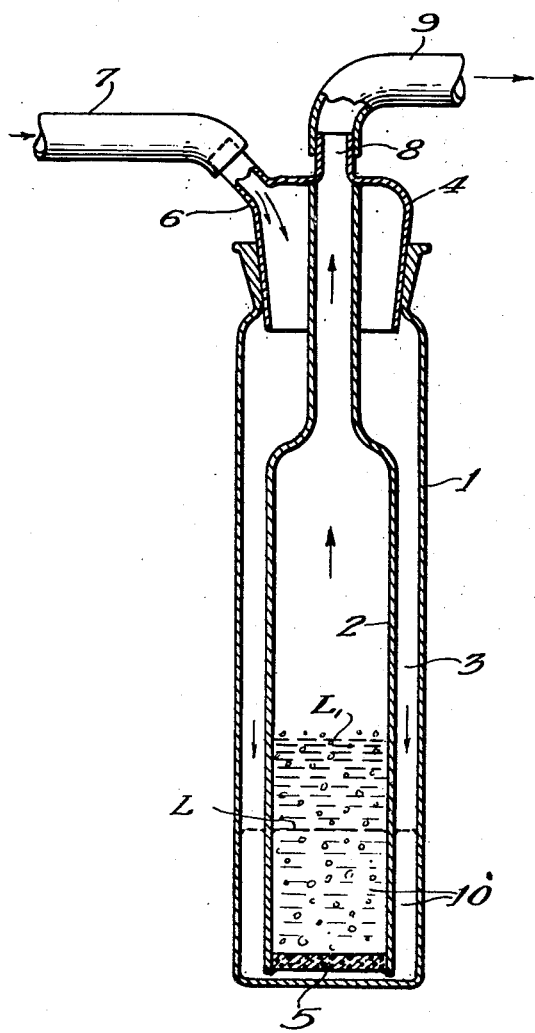

Oct. 25, 1949.　　　　W. W. JOHNSTONE　　　　2,485,739
GAS WASHING DEVICE
Filed Dec. 28, 1945

Inventor:
Warren W. Johnstone
By Maynard P. Venema
Attorney

Patented Oct. 25, 1949

2,485,739

UNITED STATES PATENT OFFICE 2,485,739

GAS WASHING DEVICE

Warren W. Johnstone, Riverside, Ill., assignor to Universal Oil Products Company, Chicago, Ill., a corporation of Delaware Application December 28, 1945, Serial No. 637,611

1 Claim. (Cl. 261—122)

This invention relates to an improved form of gas scrubber or gas washing device; more particularly it relates to an improved arrangement and construction in a gas scrubber of the laboratory type. The improvements comprised within this invention provide efficient gas scrubbing and substantially prevent washing or scrubbing solution from backing up into the gas inlet line when pressure upsets occur in the system.

The improved gas scrubber provided by my invention consists essentially of two chambers, one placed within the other, and the inner chamber being spaced from the walls of the outer chamber to provide an annular space therebetween. It is also essential that the bottom of the inner chamber be spaced from the bottom of the outer chamber to provide access thereto. Across the open lower end of the inner chamber I prefer to place a fritted glass disc which serves as a distributing member for gas introduced to said inner chamber. The upper end of the outer chamber is provided with a gas inlet line while the upper end of the inner chamber is provided with a gas outlet line. In operation, a solution to be used in scrubbing gas charged to the apparatus, for example, caustic solution is placed in the apparatus so that the inner and outer chambers are approximately one-third full. Gas is introduced to the annular space passing downwardly through the scrubbing solution and into the inner chamber through the fritted glass disc, the latter serving as a distributing member for obtaining uniform distribution throughout the solution within the inner chamber. Gas is withdrawn from the apparatus through the outlet line at the upper end of the inner chamber.

The principal object of this invention is to provide an improved type of gas scrubbing bottle or device that functions efficiently as a scrubber, as well as prevents liquid from backing up into the gas inlet line at any time. This latter feature is of value in eliminating the practice of using two gas washing bottles connected in series.

In general, the majority of present or conventional types of scrubbing bottles have inlet lines which remain substantially uniform in size and project to the lower end of the bottle where gas is discharged through an open end. One of the present types has a hooked lower end on the inwardly projecting inlet line which connects with a distributing plate of sintered or fritted glass, however, the glass plate merely distributes and bubbles the gas directly into the surrounding scrubbing solution as does the first mentioned type. In these conventional types, the volume of liquid in the bottle is large as compared to the internal volume of the inlet line or tube, thus an upset in pressure differentials within the system makes it easily possible for scrubbing fluid to back up into the inlet line and to enter the vessel from which the gas normally emanates. It is common practice in laboratories to use two of the conventional type bottles in series in order to avoid having liquid back up into the inlet line. This series connection is accomplished by having the first scrubbing bottle connected in a reverse position such that the gas charge line terminates high in the bottle and the gas outlet line is the normal inwardly projecting inlet line, while the second scrubbing bottle is connected in proper conventional manner and contains the scrubbing solution. Thus, if there is an upset in pressures, the solution in the second scrubbing bottle may back up into the other which does not have scrubbing solution, and the solution is there trapped and is prevented from backing up into the vessel from which the gas is discharged. It has also been found by laboratory workers, that the scrubbing bottles with the long-hooked inlet lines having glass distributing discs, are easily broken and rendered useless, unless handled very carefully in the laboratory.

The new improved gas scrubbing bottle provided by this invention washes the gas efficiently and at the same time eliminates the need of a second scrubber to function in the manner of a liquid trap. In a preferred form of the apparatus, the outlet line connects with a centrally positioned inner chamber placed within an outer chamber, such that a relatively small annular space is formed between the inner and outer chamber walls. This inner chamber may be considered, however, to be an enlarged extention of the gas outlet line. The lower end of this enlarged line or inner chamber terminates just slightly above the bottom of the outer chamber and is provided with a sintered or fritted glass disc which serves as a gas distributing plate for gas passing through the device. The gas inlet line communicates with the upper end of the apparatus and discharges to the annular space between the inner and outer chambers. The scrubbing solution is placed in the lower portion of the bottle and is thus contained partially within the annular space and partially within the inner chamber, when there is no gas flow therethrough. However, in operation, gases to be scrubbed flow downwardly through the annular space, then pass upwardly through the porous glass disc and through the scrubbing liquid within the inner chamber before being discharged from the upper part of the scrubbing apparatus. Thus, providing the lower end of the inner chamber adjacent to or very close to the bottom of the outer chamber, the liquid in the annular space is pushed ahead of the gas stream and remains within the inner tube or chamber throughout the gas scrubbing period. Of course, the solution will seek an equalized level within the inner tube and annular space when there is no flow of gases.

The accompanying drawing and following description thereof serves to illustrate and clarify the improved construction and the advantageous features of the new device.

Figure 1 shows a sectional elevation view of one form of the invention which has a removable top and inner chamber.

In Figure 1 of the drawing, the exterior chamber 1 of the gas washing apparatus is preferably cylindrical and provided with a wide opening at its upper end. The wide top opening allows the enlarged inside tube 2 to be inserted into the bottle or chamber 1 and thus provide a relatively small annular space 3 between the two concentric elements 1 and 2.

A stopper 4 serves to close the top of chamber 1 and at the same time suspend the enlarged outlet tube 2 so that its lower end is slightly above the bottom of the chamber 1. The lower end of the tube 2 is provided with a distributing plate or disc 5 which may be fritted glass, or other porous material, or a perforated plate. The stopper 4 has an inlet opening 6 which connects to an inlet tube 7, as well as an outlet nozzle or opening 8 which connects the smaller tapered end of enlarged tube 2, within the apparatus, to the gas outlet tube 9, exterior of the chamber.

It should be noted, that the lower end of tube 2 is very close to the bottom of chamber 1, for the peripheral or circumferential flow area, determined by the bottom edge of tube 2 and the bottom of chamber 1, should be only approximately equal to the area of the gas inlet 6. Also, the upper end of inner concentric tube 2 is tapered to connect with the outlet opening 8 at the top of stopper 4. The tapering of tube 2 may preferably be started at a point somewhat below its juncture with outlet 8, so that a considerable volumetric space is provided in the upper portion of the outer chamber. Liquid scrubbing or washing reagent 10 is placed in the lower part of the wash bottle only, say to a level L; thus, under operating conditions the surface of the liquid material in the tube 2 will be at level L₁, at approximately one-third to one-half the height of the enlarged portion of tube 2. If the lower end of tube 2 is any considerable distance above the bottom of chamber 1, then the liquid scrubbing solution 10 will not entirely be forced into the tube 2 and gas will then be forced to bubble in an uneven manner down through liquid that remains in the annular space 3, at the bottom of the device, before reaching the distributing plate 5. A liquid filling mark may be placed on the scrubber, if it is so desired, for liquid reagent might be bubbled up to the top of inner chamber 2 and outlet 8, if the device is too full and the gas velocity is high.

The gas flow through the scrubber is as indicated by the arrows on the drawing. The gas or vapors to be washed are passed to the device by way of line 7 and inlet nozzle 6 and are forced to flow down into the annular space 3, and passed from the lower end of the annular passageway through the fritted glass distributing disc 5, upwardly through the column of liquid 10 within tube 2, to the upper portion thereof to be subsequently discharged through outlet line 9. By this arrangement and flow path, the gas is efficiently washed, and the improved construction features are such that scrubbing liquid is substantially prevented from being forced backward into the line 7. A change in pressure will allow liquid level L to drop within tube 2 and liquid to rise in the outer space within chamber 1. However, with the volume of space 3 equal to or greater than that within tube 2, then liquid material will not be caused to pass into line 7.

Variations may be made in the construction of the gas scrubbing bottle, as may be noted, the stopper 4 in Figure 1 is removable and if made of glass, or like material, it may be ground to fit the bottle or chamber 1. There is, of course, considerable advantage in a removable top, in that the liquid reagent is easily added or removed, and the scrubber is easily cleaned.

In the foregoing, the description and drawing is in general directed to a laboratory type of device; however, the improved construction features and arrangement of the scrubbing bottle herein described may be enlarged and made applicable to commercial size gas washers.

I claim as my invention:

A gas scrubber comprising an outer cylindrical chamber having a removable closure member at its upper end, an inner cylindrical chamber within and spaced from the outer chamber and having a lower open end above the bottom of the outer chamber, a gas distributing member across the lower end of the inner chamber, said inner chamber having a neck portion of reduced cross-sectional area extending into said closure member and the inner chamber being thereby suspended from the closure member, an outlet in said closure member communicating with the reduced neck portion of the inner chamber, and an inlet in said closure member communicating with the upper portion of the outer chamber.

WARREN W. JOHNSTONE.

REFERENCES CITED

The following references are of record in the file of this patent:

UNITED STATES PATENTS

| Number | Name | Date |
| --- | --- | --- |
| 1,516,857 | Kavaney | Nov. 25, 1924 |
| 2,008,363 | Maris | July 16, 1935 |
| 2,013,518 | Linde | Sept. 3, 1935 |

FOREIGN PATENTS

| Number | Country | Date |
| --- | --- | --- |
| 393,390 | Germany | Nov. 16, 1921 |